(12) United States Patent
Kowalski

(10) Patent No.: US 11,463,422 B1
(45) Date of Patent: Oct. 4, 2022

(54) DECOUPLING SECURE COMMUNICATION SESSIONS FROM TRANSPORT MECHANISMS

(71) Applicant: Amazon Technologies, Inc., Seattle, WA (US)

(72) Inventor: Marcin Piotr Kowalski, Cape Town (ZA)

(73) Assignee: Amazon Technologies, Inc., Seattle, WA (US)

(*) Notice: Subject to any disclaimer, the term of this patent is extended or adjusted under 35 U.S.C. 154(b) by 127 days.

(21) Appl. No.: 16/912,605

(22) Filed: Jun. 25, 2020

(51) Int. Cl.
| | |
|---|---|
| *G06F 15/16* | (2006.01) |
| *H04L 9/40* | (2022.01) |
| *H04L 69/326* | (2022.01) |
| *H04L 69/16* | (2022.01) |
| *H04L 67/141* | (2022.01) |

(52) U.S. Cl.
CPC ........ *H04L 63/0442* (2013.01); *H04L 63/166* (2013.01); *H04L 67/141* (2013.01); *H04L 69/16* (2013.01); *H04L 69/326* (2013.01)

(58) Field of Classification Search
CPC . H04L 63/0442; H04L 63/166; H04L 67/141; H04L 69/16; H04L 69/326
USPC ....................................................... 709/203
See application file for complete search history.

(56) References Cited

U.S. PATENT DOCUMENTS

| | | | |
|---|---|---|---|
| 7,086,086 B2 | 8/2006 | Ellis | |
| 7,620,015 B2 * | 11/2009 | Lenzarini | .......... H04L 29/12396 455/418 |
| 8,185,617 B1 | 5/2012 | Mukeiji | |
| 8,478,986 B2 | 7/2013 | Merugu et al. | |
| 8,490,165 B2 | 7/2013 | Wray | |
| 8,769,265 B1 | 7/2014 | Hughes et al. | |
| 9,253,015 B2 * | 2/2016 | Girard | .................... H04L 47/762 |
| 9,781,161 B2 | 10/2017 | Egorov | |
| 10,237,078 B2 | 3/2019 | Prince et al. | |
| 2007/0165572 A1 * | 7/2007 | Lenzarini | .......... H04W 36/0011 370/389 |
| 2008/0228864 A1 * | 9/2008 | Plamondon | ......... G06F 16/9574 709/203 |
| 2013/0111038 A1 * | 5/2013 | Girard | .................... H04W 80/06 709/226 |
| 2016/0112544 A1 * | 4/2016 | Girard | .................... H04L 47/801 709/230 |
| 2016/0119250 A1 * | 4/2016 | Girard | .................... H04L 47/803 709/226 |

OTHER PUBLICATIONS

Uda Hlwarale, "A brief overview of the TCP/IP model, SSL/TLS/HTTPS protocols and SSL certificates", Retrieved from https://itnext.io/a-brief-overview-of-the-tcp-ip-model-ssl-tls-https-protocols-and-ssl-certificates-d5a6269fe29e on Apr. 10, 2020, pp. 1-56.

(Continued)

*Primary Examiner* — Moustafa M Meky
(74) *Attorney, Agent, or Firm* — Robert C. Kowert; Kowert, Hood, Munyon, Rankin & Goetzel, P.C.

(57) ABSTRACT

A first communicating entity determines session state parameters of a security protocol session between itself and a second communicating entity. The first entity uses the session state parameters to transmit a first set of messages of the session to the second entity via a first communication mechanism. The first entity also uses the session state parameters to transmit a second set of messages of the session to the second entity via a second communication mechanism.

20 Claims, 9 Drawing Sheets

(56) References Cited

OTHER PUBLICATIONS

Vincent Bernat, "Speeding up TLS: enabling session reuse", Retrieved from https://vincent.bernat.ch/en/blog/2011-ssl-session-reuse-rfc5077 on Apr. 13, 2020, pp. 1-11.

Agathoklis Prodromou, "TLS Security 5 : Establishing a TLS Connection", Retrieved from https://www.acunetix.com/blog/articles/establishing-tls-ssl-connection-part-5/on Apr. 10, 2020, pp. 1-15.

\* cited by examiner

DECOUPLING SECURE COMMUNICATION SESSIONS FROM TRANSPORT MECHANISMS

BACKGROUND

Many modern computer-based applications are accessed via networks. Application clients running at respective computing devices submit application requests over a network to application servers running at a different set of computing devices, and receive response from the servers via the network. In some cases, the application requests and/or responses can include sensitive data, whose loss or compromise can have serious negative consequences for the application providers and users.

A number of security protocols, such as various versions of SSL (Secure Sockets Layer) and TLS (Transport Layer Security), have been developed over the years to protect such sensitive data. As part of an initial set of steps used to establish secure sessions in such protocols, a negotiation procedure involving resource-intensive computations and the exchange of cryptographic artifacts associated with the computations is typically performed by the client and the server. For example, in some security protocols, public-key cryptography techniques involving elliptic curve computations may be used in the client-server negotiation.

Figure 1:
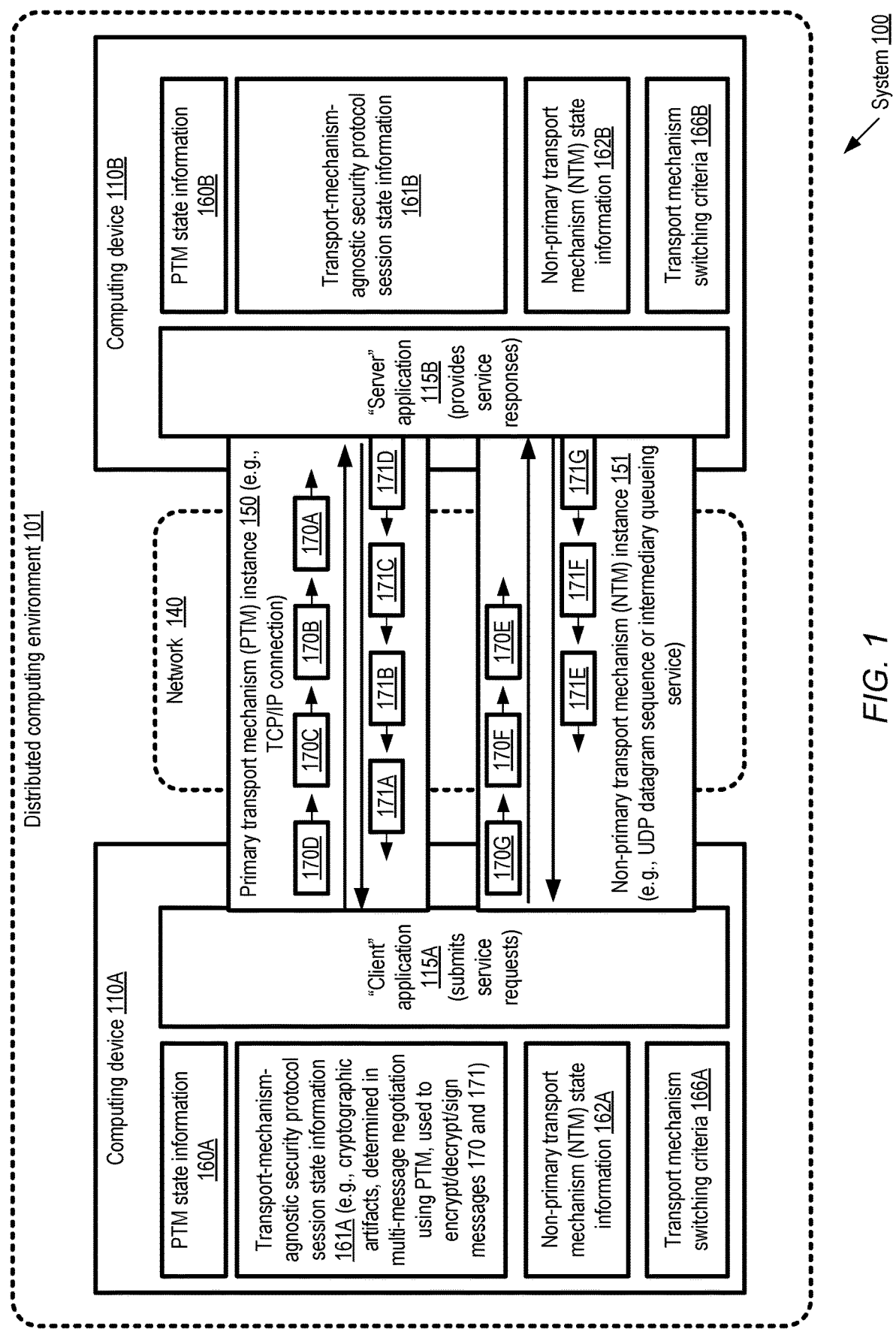
FIG. 1 illustrates an example system environment in which a set of security protocol state information, determined via a session establishment negotiation between two applications, may be used to secure communications of the two applications over a plurality of transport mechanisms, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for decoupling the state information of long-running security protocol sessions (such as TLS sessions) from the state information of the underlying data transport mechanisms (such as Transmission Control Protocol (TCP) connections). The term "transport mechanism" is used herein to refer to any automated communication technique which can be used to transfer messages between a pair of communicating entities (e.g., application processes) running at respective computing devices. The formats of the messages transferred among the communicating entities, and characteristics such as whether the messages are received synchronously or asynchronously relative to their sending, or necessarily received in the same order in which they are sent, may differ from one transport mechanism to another. In some cases, a particular example or instance of a transport mechanism may simply comprise a set of messages or packets transmitted using a transport layer protocol (e.g., TCP or UDP (User Datagram Protocol)) of the transport layer of the Open Systems Interconnect (OSI) model. In other cases, an instance of a transport mechanism may use more complex services or applications built on top of OSI transport layer protocols, such as a message queueing service of a provider network or cloud computing environment, a notification service of a provider network, a distributed file system whose files can be accessed/modified by the communicating entities, an email service, and the like. The term "application" is used herein generically to refer to a program (or a portion of a program, such as one process or thread among many processes of the same program) which transmits and/or receives messages from other programs (or portions of other programs). Some applications may run with user-level privileges, while others may run with administrator or root-level privileges.

Negotiation procedures conducted between a pair of applications or processes participating in a given security protocol session to agree on the state information (such as keys to be used to encrypt/decrypt subsequent messages of the session) typically require computationally expensive operations. In many existing implementations of security protocols, the state information of a session is very tightly coupled to the transport mechanism used for the messages exchanged during the negotiation. For example, a TCP connection may first be set up (involving its own initial negotiation or handshake procedure to establish transport mechanism state information), and then a TLS session may be set up using the TCP connection. If the TCP connection is terminated, for example due to network failure or error, the TLS session coupled to it is also terminated in at least some existing implementations. In order to resume secure communication between the applications which were using a now-terminated TLS session, the computationally-intensive TLS negotiation have to be conducted again. In some distributed environments in which numerous (e.g., tens of thousands) of TLS sessions established with a set of back-end servers are expected to be used for long periods of time, a network failure can potentially lead to a very large number of near-concurrent re-negotiations in which the servers have to participate, which can severely impact the performance of the applications being implemented at the back-end servers.

The proposed approach, in which the security protocol session state information is decoupled from the transport mechanism, allows the state information of a given security protocol session to be re-used, if needed, across instances of different transport mechanisms. For example, if the TCP connection over which the state information was initially negotiated is terminated or ended due to a bug or due to transient network errors, UDP messages, or a message queueing service may be used to transfer additional messages of the same session between the session participants. If a cryptographic key K1, stored as part of the session's state information, was being used to encrypt contents of the session's messages before the TCP connection was terminated, K1 may also be used to decrypt the additional messages sent via UDP or the message queue. As a result, re-negotiation procedures of the security protocol session can be avoided without compromising the security of the data being transferred among the session participants. If needed, the applications may switch back to using an instance of the original transport mechanism (e.g., a new TCP connection) under certain conditions, again without re-negotiating the security protocol session. Various details of the potential transitions between the transport mechanisms may be negotiated once between the communicating applications, e.g., as an extension of the security protocol session negotiations. Such details may include, for example, an agreement on the specific alternative transport mechanism(s) which are going to be used, the conditions under which the transitions are to be initiated, and so on.

As one skilled in the art will appreciate in light of this disclosure, certain embodiments may be capable of achieving various advantages, including some or all of the following: (a) reducing the amount of computing and networking resources used to secure communications between applications, (b) enhancing the performance of network-accessible services, e.g., in a cloud computing or provider network environment, during recovery from unanticipated events such as network failures, as well as during periods in which planned events such as software/hardware updates are scheduled, and/or (c) improving the user experience of clients of network-accessible applications, e.g., by avoiding delays involved in re-establishing security protocol sessions used to perform operations on behalf of the clients.

According to some embodiments, a system may comprise a plurality of computing devices, including a first and a second computing device. The first computing device may include instructions that upon execution cause the first computing device to implement at least a portion of a first application, while the second computing device may include instructions that upon execution cause the second computing device to implement at least a portion of a second application which communicates with the first application. The first application may initiate, using a first transport mechanism, establishment of a session of a security protocol (such as TLS or SSL) with the second application. The establishment of the security protocol session (SPS) may comprise a multi-message negotiation in which asymmetric cryptography computations are performed in at least some embodiments. One or more elements of state information of the SPS may be stored in a first data structure at the first computing device, and in a corresponding data structure at the second computing device. One or more elements of state information of the first transport mechanism may also be stored, but in a different data structure than the one used to store the SPS state information, at both computing devices in various embodiments. The SPS state information may, for example, include one or more cryptographic artifacts to be used for encrypting messages sent during the SPS. The transport mechanism state information may include, for example in the case of a TCP connection, one or more port numbers, Internet Protocol (IP) addresses, initial message sequence numbers, TCP window parameters and the like.

In various embodiments, the first application may provide an indication, to the second application, of an alternative transport mechanism to be used for sending/receiving one or more messages of SPS if a triggering condition is met. For example, if the first transport mechanism is a TCP connection, the triggering condition may comprise a detection of a closing or termination of the TCP connection, and the alternative transport mechanism may comprise a set of UDP datagrams, a shared file from which messages can be read, and so on. In some embodiments, the information about the alternative transport mechanism may be provided in a step added on to the baseline negotiation of the SPS state information, and both applications may be required to negotiate on, and indicate their approval of, the alternative mechanism. In other embodiments, the indication of the alternative transport mechanism may be provided in a message unassociated with the negotiation.

The first application may transmit a set of messages to the second application using the first transport mechanism, and receive messages (e.g., responses) from the second application over the first transport mechanism in various embodiments. In embodiments in which the SPS state information comprises cryptographic keys, one or more of such leys may be used to encrypt/decrypt the messages sent via the first transport mechanism.

In response to detecting that a triggering condition for transitioning to the alternative transport mechanism has been satisfied, the first application may transfer at least one message of the SPS to the second application using the alternative transport mechanism in some embodiments, without implementing (or re-implementing) a multi-message negotiation as was needed when the SPS was initially established. If the SPS requires the encryption of message contents, the same key(s) which were used prior to the change of transfer mechanisms may continue to be used to encrypt any messages sent via the alternative transport mechanism in various embodiments. As such, the state information of the SPS may continue to be used for the communications between the applications, despite the change of transport mechanisms. The second application may, for example, decrypt the messages sent using both the transport mechanisms using the same cryptographic keys (stored as part of the SPS state information at the computing device at which the second application runs). Note that the first and second applications may be interchangeable in at least some embodiments with respect to various aspects of the transition to the use of the alternative transport mechanism—e.g., either application may inform the other about the possible use of the alternative transport mechanism, either application may detect the condition that triggers the actual use of the alternative mechanism, and/or either application may start the use of the alternative mechanism.

Any of a number of different triggering conditions may lead to the use of the alternative transport mechanism in different embodiments. For example, such a transition may result from a network failure (in which for example respective sets of computing devices, which were communicating successfully, become disconnected at least for some time period), detection of network congestion or other types of network performance degradation, non-transient network errors, an indication of a planned event such as the rollout of software/firmware/hardware updates to a set of networking devices or computing devices, and so on. In at least one embodiment, after switching from using one the first transport mechanism to a second transport mechanism in response to one condition/criterion, the communicating applications may switch back to the first transport mechanism if a second condition or criterion is satisfied. In some cases, instead of switching to a different transport mechanism, different instances of the same transport mechanism may be used in succession by the communicating entities during a given SPS. In one such example scenario, a first TCP connection (e.g., using a source port S1, a destination port D1, a source IP address IPAddr1 and a destination IP address IPAddr2) may be used for the SPS negotiations and for sending some number of messages. Then, a decision may be made to abandon further use of the first TCP connection based on some criteria, and a second TCP connection (which may use the same combination of ports and IP addresses, or a different combination of ports and IP addresses) may be established for transferring additional messages of the same SPS session. In some embodiments, in which for example at least one of a pair of computing devices among which the SPS is established is a resource of a provider network or cloud computing environment, the use of the alternative transport mechanisms may be initiated in response to a programmatic request from a client of the provider network—e.g., the client may indicate that multiple transport mechanisms are to be used for an application run at the provider network on behalf of the client.

In some embodiments, as indicated above, the techniques for decoupling security sessions from the underlying transport mechanisms may be implemented at one or more network-accessible services of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as a parameter tuning service or a network intermediary service at which parameters are tuned automatically. A VCS may also be referred to as an elastic compute service, virtual machines service, computing cloud service, compute engine, and/or cloud compute in various implementations.

Example System Environment

FIG. 1 illustrates an example system environment in which a set of security protocol state information, determined via a session establishment negotiation between two applications, may be used to secure communications of the two applications over a plurality of transport mechanisms, according to at least some embodiments. A distributed computing environment 101 of system 100 may include a plurality of computing devices at which respective applications (or portions of applications) may be implemented. For example, a client application 115A may run at computing device 110A, and submit service requests to a server application 115B running at computing device 110B. The server application 115B may send responses or results of the service requests to the client application 115A. A given computing device 110 may comprise a compute instance (such as a virtual machine) of a virtualized computing service of a provider network in some cases; in other cases, a computing device 110 may be a non-virtualized server at a provider network or at a premise external to the provider network. The server application 115B may be accessed from the client application over a network 140 in the depicted embodiment. Network 140 may include portions of the public Internet in some cases, or may comprise private network devices and links of one or more provider networks.

In at least some embodiments, the client application 115A may initiate, using an instance 150 of a primary transport mechanism (PTM), the establishment of a security protocol session (e.g., a TLS or SSL session) with the server application 115B. Depending on the specific transport mechanism selected as the PTM, different types of transport-related state information 160A (e.g., information about source and destination IP addresses and ports in the case where the PTM instance comprises a TCP connection, etc.) may be stored at the computing device 110A and updated as needed, e.g., in one or more data structures managed by components of an operating system or a networking software stack. Corresponding PTM state information 160B may similarly be stored and updated at computing device 110B.

The establishment of the security protocol session may require a multi-message negotiation in which asymmetric cryptography computations are performed at one or both of the applications 115 in the depicted embodiment. For example, in an implementation in which the PTM instance is a TCP connection, one or more TCP packets may be sent from the client application 115A to the server application 115B during the negotiation, and one or more TCP packets may be sent from the server application 115B to the client application 115A. Depending on the specific security protocol being used (and the parameters selected for the protocol), the message/packet sequence used for the negotiation may vary. If TLS version 1.2 is used, for example, in some implementations the client application 115A may initiate the negotiation by sending a "Client Hello" message, indicating the preferred SSL/TLS version, cipher suite and compression method of the client application. The "Client Hello" message may include a proposed TLS session identifier, and a random value ("Client-Random") generated by the client (used later in the negotiation for generating a key). A cipher suite indicates cryptographic algorithms to be used for tasks such as key exchanges, authentication, and bulk data encryption. For example, the string "TLS_ECDHE_ECDSA_WITH_AES128_GCM_SHA256" may be used by the client application to indicate a preferred cipher suite. The substring "TLS" indicates that TLS is the protocol being used, "ECDHE" indicates the Elliptic Curve Diffie-Hellman key exchange algorithm, "ECDSA" indicates that the Elliptic Curve Digital Signature Algorithm is to be used for authentication, "AES_128_GCM" indicates that the Advanced Encryption Standard 128-bit Galois/Counter Mode algorithm is to be used for data encryption, and "SHA256" indicates that the Secure Hash Algorithm 256-bit is to be used as the Message Authentication Code (MAC) algorithm. The client application may also request additional functionality for the session, such as supported groups for elliptic curve cryptography, point formats for elliptic curve cryptography, signature algorithms, and the like. If the server application 115B is unable to provide the requested functionality, the client application 115A may abort the negotiation.

The server application 115B may respond to the "Client Hello" message with a "Server Hello" message, agreeing to the client application's proposed set of algorithms (or suggesting alternatives), and providing a server-side random value "Server-Random". The server application 115B may then send a message containing a digitally signed server-side TLS/SSL certificate intended to prove the server application's identity to the client application, and provide the server application's public key. The client application may then optionally send a signed client-side certificate to the server. The server application may in some cases send a "Server Key Exchange" message, followed by a "Server Hello Done" message. After the client application receives the "Server Hello Done" message, the client application may create a "pre-master" secret key and send it to the server (in encrypted form) in a "Client Key Exchange" message. The client and server applications then compute a shared "master" secret key (using the random values "Client-Random" and "Server-Random" exchanged earlier in the negotiation), which can then be used to symmetrically encrypt the data for the rest of the communication. The client application may then send a "Client Change Cipher Spec" message to the server application, indicating that the client application is ready to start using the symmetric shared master key, followed by a "Client Handshake Finished" message. The server application may also send a "Server Change Cipher Spec" message to the client, followed by a "Server Handshake Finished" message to conclude the negotiation. For security protocols other than TLS 1.2, the negotiation procedure may require fewer (or more) steps. One or more of the operations performed during the negotiation, such as authentication, digital signature generation and the like in the case of TLS, may be compute-intensive in at least some embodiments.

State information 161A of the security protocol session (SPS) (including, for example, the agreed-upon cipher suites, cryptographic keys etc.), at least some of which is computed or agreed upon during the negotiation, may be stored at the computing device 110A, e.g., in a separate set of data structures than those used for the PTM state information 160A. Similarly, corresponding SPS state information 161B of the security protocol session may be stored at computing device 110B. The elements of the SPS state information may also be referred to as parameters of the SPS in various embodiments. Such parameters may be used to prepare, transform and/or analyze at least some of the messages exchanged during the SPS in at least some embodiments (e.g., by encrypting a message at the sending side, decrypting the message at the receiving side, generating a signature of message contents at the sending side, analyzing the signature at the receiving side to ensure that the message has not been tampered with in transit, etc.). In at least one embodiment, the SPS state information 161 may include respective sets of artifacts/parameters corresponding to different transport mechanisms which may be used during the SPS—for example, a first set of cryptographic artifacts included within the state information 161 may be used to encrypt/decrypt the messages sent over a first transport mechanism, and a second set of cryptographic artifacts included within the state information 161 may be used to encrypt/decrypt the messages sent over a second transport mechanism.

The SPS state information 161A may be described as being transport-mechanism-agnostic in the embodiment depicted in FIG. 1, in that the same session may be conducted using multiple transport mechanisms (or multiple instances of the same transport mechanism), without requiring the computationally expensive negotiation to be performed for each of the different transport mechanisms. In at least some embodiments, a client application 115A may send the server application 115B an indication of an alternative or non-primary transport mechanism (NTM) which may (in some circumstances, e.g., after a triggering condition has been met) be used for the SPS which was established using the PTM. In one implementation, such an indication may be provided, for example, in one or more messages exchanged via the PTM instance 150 after the negotiation phase of the SPS has been completed. In other implementations, such an indication may be provided during the negotiation procedure itself; that is, the client and server applications 115A and 115B may negotiate and agree on the alternative or non-primary transport mechanism in a manner analogous to the way in which a cipher-suite and/or other SPS state information elements were negotiated and agreed upon. In some implementations, the transport mechanisms to be used as the PTM and/or as an NTM may be indicated in one or more messages exchanged between the client and server applications prior to the SPS negotiation phase.

In various embodiments, after the SPS has been set up using instance 150 of the PTM, numerous messages of the SPS, secured (e.g., encrypted) using the SPS state information, may be transmitted via the instance 150 of the PTM in one or both directions between the client and server applications. As shown in FIG. 1, for example, client application 115A may send messages 170A, 170B, 170C, and 170D to server application 115B via PTM instance 150, and also receive messages 171A, 171B, 171C and 171D from the server application 115B via PTM instance 150.

If the client application 115A (or the server application 115B) detects that a triggering condition for transitioning to a different transport mechanism is satisfied, the use of an instance 151 of NTM may be initiated in the depicted embodiment. Any of a number of reasons or conditions may lead to the switch from the PTM to the NTM in different embodiments, as discussed below in further detail. Using the same transport-mechanism-agnostic SPS state information 161A and 161B (e.g., for encryption, decryption, signature generation, etc.), a set of messages may be sent via the NTM instance 151 in either direction. For example, in the scenario shown in FIG. 1, the client application may send messages 170E-170G to the server application 115B using the NTM, and the server application may send messages 171E-171G to the client application 115A using the NTM. The contents of messages 170E-170G may be encrypted/decrypted using the same SPS state information which was earlier used to encrypt/decrypt messages 170A-170D, avoiding re-negotiation of the SPS state.

In some embodiments, the same underlying network 140 may be used for both the PTM and the NTM (e.g., the PTM may comprise a TCP connection, while the NTM may comprise a set of UDP datagrams or the use of an intermediary queuing service whose resources are also configured within network 140). In other embodiments, different networks may be used for the PTM and the NTM. Depending on the specific transport mechanism selected as the NTM, state information 162A and 162B may optionally be stored, e.g., in data structures distinct from those used for SPS state information 161A and 161B, at the computing devices 110A and 110B. Representations of the criteria 166 (e.g., 166A and 166B) that trigger the transitions between transport mechanisms may also be stored at the computing devices 110A and 110B in at least some embodiments. In some implementations, such criteria may be stored as part of the SPS state information.

Note that while the terms "client" and "server" are used in FIG. 1 to describe the applications 115A and 115B which collectively establish an SPS using a first transport mechanism, and then re-use the SPS state information to continue communicating over an alternative transport mechanism, a similar approach may be implemented for any pair of applications or programs between which resilient and secure communication is desired in various embodiments. In some embodiments, communicating applications may switch between transport mechanisms multiple times in a given SPS—e.g., from the PTM to a first NTM, from the first NTM to the PTM, from the PTM to a second NTM, and so on. In one embodiment, the applications may negotiate the details of the SPS using a first transport mechanism, and then exchange further messages using a different transport mechanism—that is, none of the application data may necessarily be exchanged using the transport mechanism which was used to set up the SPS. In at least one embodiment, the same SPS state information 161 may be used for multiple instances of the same transport mechanism—e.g., a first TCP connection may be used to transfer/exchange one set of messages of the SPS, and then a second TCP connection may be used to transfer/exchange additional messages of the SPS.

Example Use Scenarios

Figure 2:
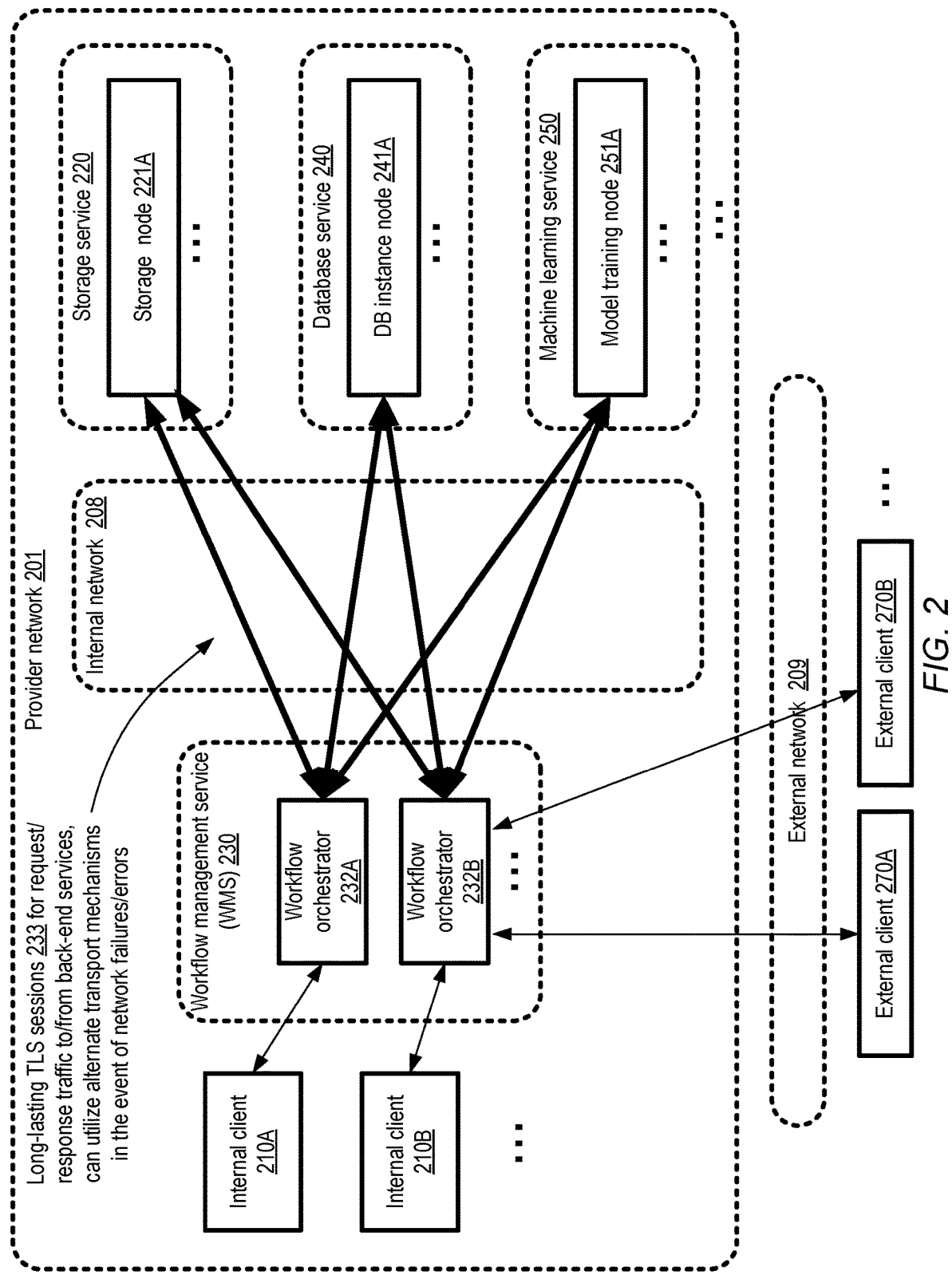
FIG. 2 illustrates an example scenario in which a long-lasting secure communication session between resources at a provider network may be conducted using a plurality of alternate transport mechanisms in the event of network failures, according to at least some embodiments.

FIG. 2 illustrates an example scenario in which a long-lasting secure communication session between resources at a provider network may be conducted using a plurality of alternate transport mechanisms in the event of network failures, according to at least some embodiments. In the depicted embodiment, a provider network 201 may implement numerous network-accessible services, such as a storage service 220, a database service 240, a machine learning service 250, as well as a workflow management service (WMS) 230. The workflow management service 230 (which itself may be implemented using a virtualized computing service (VCS) in some cases) may be utilized by internal clients 210, such as 210A or 210B (e.g., respective programs running at VCS compute instances) as well as external clients 270A or 270B to help execute complex task pipelines in the depicted embodiment. A given task pipeline may comprise numerous stages, in several of which one or more provider network services may have to be used on behalf of the client in some embodiments.

Internal or external clients of the WMS 230 may submit requests (e.g., via external network 209 or via internal networks of the provider network) to implement one or more tasks of a given pipeline, to workflow orchestrators 232 (e.g., 232A or 232B) of the WMS in the depicted embodiment. The workflow orchestrators 232 may establish and maintain long-lasting TLS sessions 233 with resources at other services, such as storage node 221A of storage service 220, database instance node 241A of database service, or model training node 251A of the machine learning service 250. Such sessions may be used to send requests on behalf of the clients to the provider network services, and receive corresponding responses which are then forwarded to the clients from the WMS 230. The workflow orchestrators 232 may in effect be configured as multi-tenant intermediaries on behalf of internal and external clients 210 and 270, enabling the clients to take advantage of the functionality of numerous services without having to establish direct connectivity to the services. A given workflow orchestrator 232 may in some cases establish hundreds or thousands of TLS sessions, and use the sessions for implementing workflows on behalf of large numbers of internal or external clients; the same TLS session may be used for numerous clients over time. Some TLS sessions may be used for weeks or months.

In at least some embodiments, the TLS sessions 233 may be decoupled from underlying transport mechanisms using the techniques described above in the content of FIG. 1. Initially, for example, the TLS sessions may use TCP connections over internal network 208 of the provider network 201. If, however, a network failure event occurs, such that the TCP connection being used for a given TLS session 233 is closed or terminated, the workflow orchestrator and the back-end service node may switch to using an alternative transport mechanism (such as UDP) for at least some subsequent messages of the same session. The workflow orchestrator 232 may, for example, take on the role of the "client" application 115A of FIG. 1, and the back-end service node (e.g., 221A, 241A or 251A) may assume the role of the "server" application 115B of FIG. 1. If the TLS sessions 233 are not decoupled from the transport mechanisms used for transferring messages to the back-end services, an outage or other similar event at internal network 208 may require hundreds or thousands of security protocol sessions to be re-negotiated, which may cause substantial degradation in the performance of workflow operations being conducted with the help of WMS 230.

Figure 3:
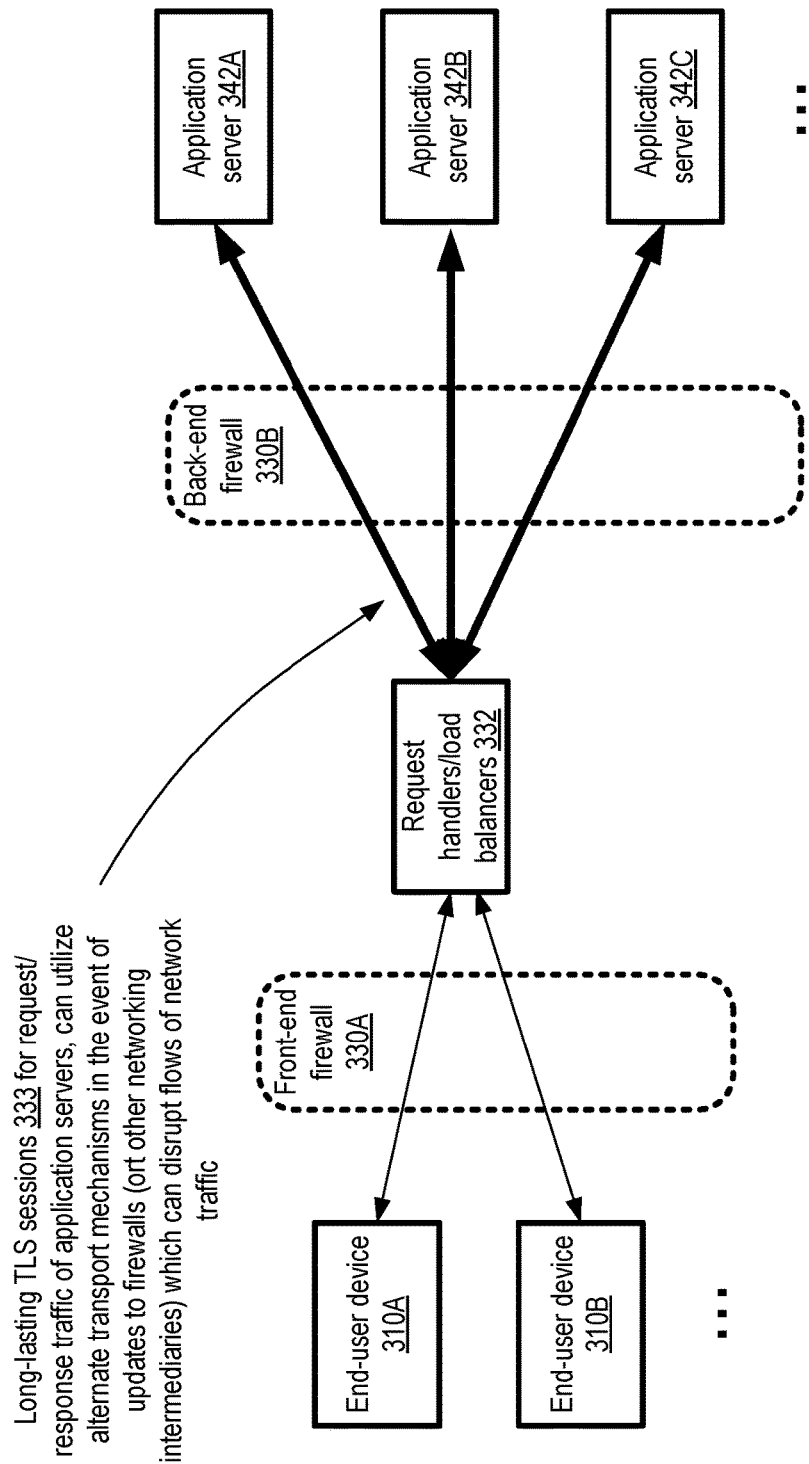
FIG. 3 illustrates an example scenario in which software updates to network components such as firewalls may trigger the use of alternate transport mechanisms for a given security protocol session, according to at least some embodiments.

FIG. 3 illustrates an example scenario in which software updates to network components such as firewalls may trigger the use of alternate transport mechanisms for a given security protocol session, according to at least some embodiments. In the depicted embodiment, a distributed application may be implemented at a collection of application servers 342, such as 342A, 342B and 342C. Application requests directed to the servers 342 may be sent from end-user devices 310 (e.g., 310A or 310B) via intermediary request handlers or load balancers 332. The intermediary request handlers 332 may establish a set of long-lasting TLS sessions 333 (which are decoupled from the underlying transport mechanisms using techniques similar to those discussed in the context of FIG. 1) with the application servers 342.

A front-end firewall 330A may be set up between the end-users' devices 310 and the request handlers, and a back-end firewall 330B may be set up between the request handlers and the application servers. In the event that an update of the software/firmware being used for the firewall 330B is scheduled, the transport mechanisms (e.g., TCP connections) being used for the TLS sessions 333 may have to be closed/terminated in the depicted embodiment. The TLS sessions 333 may be continued using alternate transport mechanisms, so that the requests and responses continue to flow between the end-user devices and the application servers 342.

Methods of Decoupling Transport Mechanisms from Secure Communication Sessions

Figure 4:
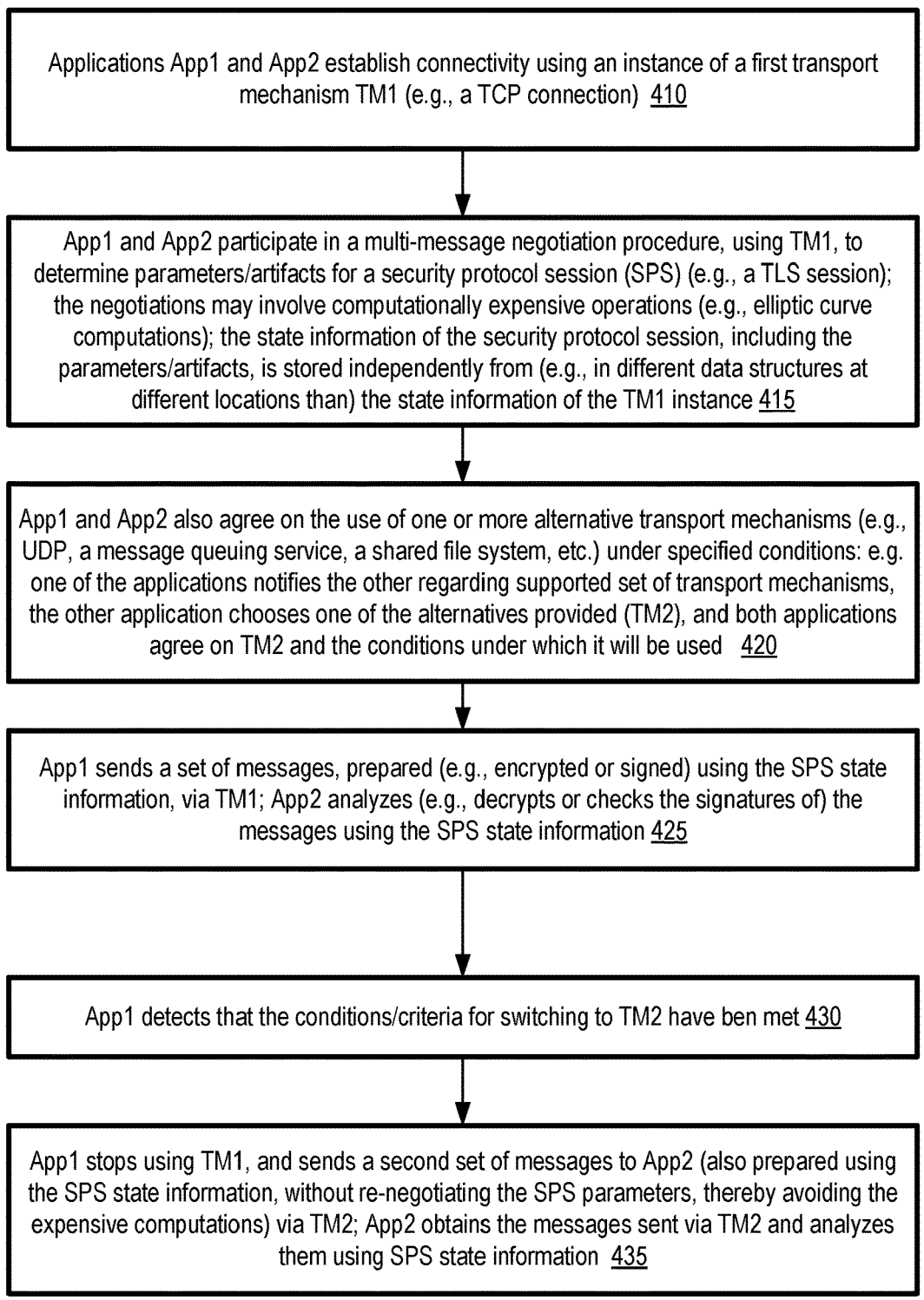
FIG. 4 is a flow diagram illustrating aspects of operations that may be performed to utilize multiple transport mechanisms for a single session of a security protocol, according to at least some embodiments.

FIG. 4 is a flow diagram illustrating aspects of operations that may be performed to utilize multiple transport mechanisms for a single session of a security protocol, according to at least some embodiments. As shown in element 410, a pair of applications App1 and App2 may establish network connectivity with each other using an instance of a first transport mechanism TM1, such as a TCP connection.

In order to enhance the security of their communication, App1 and App2 may implement a multi-message negotiation procedure, using TM1, to establish a session of a security protocol such as TLS (element 415). The negotiation, during which one or more security-related parameters/artifacts (such as, but not limited to, cryptographic keys) may be generated may require computationally expensive operations in various embodiments. In some embodiments, for example, elliptic curve cryptography algorithms may have to be executed during the negotiations. The state information of the security protocol session (SPS), including the parameters/artifacts computed or agreed upon by the applications, may be stored and managed independently of the state information of the TM1 instance in the depicted embodiment. For example, different data structures may be used for the state information of TM1 and the SPS, and/or different components of the operating systems or networking software stacks being used for App1 and App2 may be responsible for storing and maintaining the state information of TM1 and the SPS. In some embodiments, TM1 may be stateless, so no state information may have to be stored for TM1. Note that any appropriate security protocol may be used for the SPS in different embodiments, including custom security protocols rather than TLS/SSL.

App1 and App2 may also agree on the use of one or more alternative transport mechanisms for the SPS under specified conditions in the depicted embodiment (element 420). If TM1 is a TCP connection, for example, the alternate transport mechanisms may include UDP, a message queueing service, a shared file system, etc. In some implementations, one of the applications App1 or App2 may notify the other regarding supported sets of alternate transport mechanisms, and the other application may select one of the supported mechanisms (TM2) as the one to use as an alternate to a primary transport mechanism. In one embodiment, the mechanisms may ranked in order of preference by an application when presenting choices for alternate transport mechanisms to the other application. For example, from the perspective of App1, it may be the case that UDP datagrams may be preferred to the use of a message queue service as an alternative transport mechanism to TCP, and the message queue service may be preferred to a shared file system. App1 may indicate these preferences to App2, in effect suggesting that if possible, App2 should agree to use one of the alternatives preferred by App1. The two applications may also agree, via one or more messages, on the conditions under which the switch to the alternate transport mechanism is to be made, as well as other parameters such special tokens or artifacts which can be used to logically link the messages of the SPS to each other. For example, a cryptographic token or identifier to be included in all SPS messages may be computed/determined by App1 and App2, and a sequence number encoding mechanism may be chosen, such that it becomes possible for App1 to recognize that a given message received from App2 via TM2 is part of the same SPS as an earlier-received messages obtained via TM1.

App1 and App2 may exchange some number of SPS messages securely using TM1 and the SPS state information in the depicted embodiment. For example, App1 may prepare (e.g., encrypt, or digitally sign) a set of messages using the SPS state information (element 425) before sending them to App2 via TM1, and App2 may analyze (e.g., decrypt, or check the signatures of) the received messages using the SPS state information.

At some point, App1 may detect that the conditions or criteria to switch to using TM2 have been satisfied (element 430). App1 may then stop using TM1, and send a second set of messages to App2 (also prepared using the SPS state information) to App2 via TM2 (element 435). The negotiation procedure which was performed earlier by App1 and App2 may not have to be re-implemented, thereby avoiding the resource-intensive computations required for the negotiation. App2 may obtain the messages sent via TM2 and analyze them using its own version of the SPS state information. It is noted that in various embodiments, some of the operations shown in FIG. 4 may be implemented in a different order than that shown in the figure, or may be performed in parallel rather than sequentially. Additionally, some of the operations shown in FIG. 4 may not be required in one or more implementations.

App1 and App2 may be designed to be robust and resilient with respect to various types of anomalies or unexpected events associated with transitions from one transport mechanism to another in some embodiments. In one embodiment, it may be the case that messages sent via TM1 are received in the same order in which they are sent, but some messages sent via TM2 are not received in the order in which they were sent. In such a scenario, in some implementations the recipient application may be programmed to accept some number of out-of-order messages; in other implementations, the recipient application may discard out-of-order messages and/or request retransmissions of the contents of the out-of-order messages. Similarly, in some embodiments in which the SPS state information is used to decrypt received messages at a recipient, the following sequence of events may occur. First, a set of messages may be received via TM1 at a recipient application (App1 or App2), and decrypted successfully. Then, after a decision to transition to TM2 has been made, the recipient may examine messages which appear to have been sent to it via TM2, but cannot be decrypted successfully using the SPS state information (e.g., when the decryption key is used to transform the received message, the output of the decryption algorithm appears to be random/garbage data instead of a coherent message). This may occur, for example, if the instance of the particular transport mechanism being used for TM2 permits multiple entities to transmit messages over the same instance, and the messages that appeared to belong to the SPS actually belonged to some other legitimate communication session (or were generated by a malicious entity). In such a scenario, in various embodiments the recipient may simply discard TM2 messages that cannot be successfully decrypted, and continue the SPS communication based only on the subsequent messages (if any) that can be successfully decrypted using the SPS state information. The same SPS state information may thus be retained, and may successfully be used for subsequent messages, even if some messages of the SPS have to be discarded due to detected anomalies/problems associated with the messages.

Example Timeline

Figure 5:
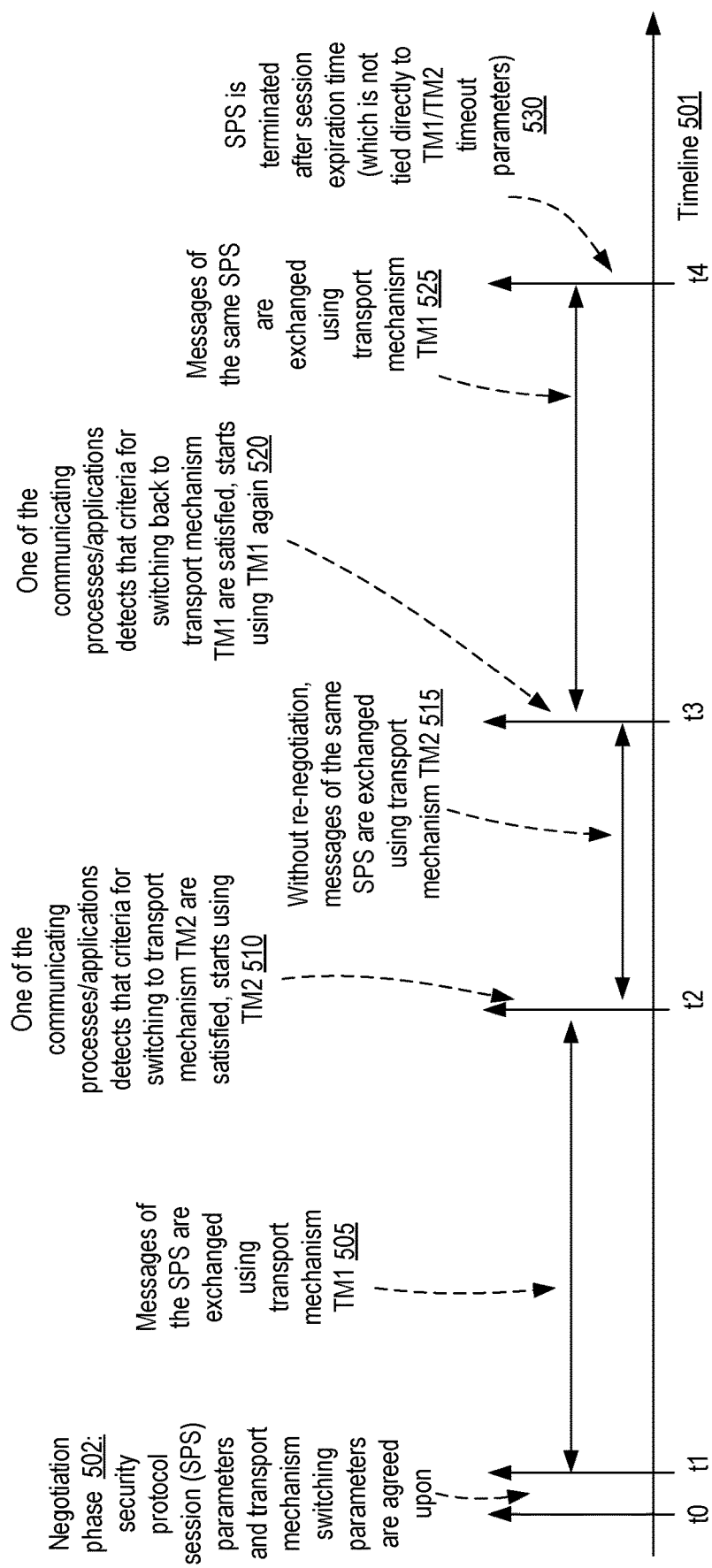
FIG. 5 illustrates an example timeline of events involving transitions between a pair of transport mechanisms for a security protocol session, according to at least some embodiments.

In some embodiments, as mentioned earlier, applications may start a secure communication session using a first transport mechanism, switch to a second transport mechanism under some conditions, and eventually switch back to the original transport mechanism, e.g., when the conditions that led to the transition no longer hold. FIG. 5 illustrates an example timeline of events involving transitions between a pair of transport mechanisms for a security protocol session, according to at least some embodiments.

At time t0 along timeline 501, a negotiation phase 502 of a security protocol session (SPS) is begun between two communicating entities such as processes or applications, e.g., using a first transport mechanism TM1. Between t0 and t1, various parameters of SPS (such as cryptographic keys to be used for subsequent messages, compression algorithms to be used for the messages, etc.) as well as parameters/ conditions that are to cause transition to a second transport mechanism TM2 and re-transitions back to TM1 are agreed upon among the communicating entities, e.g., via an exchange of one or more messages in either direction using TM1. The communicating entities exchange some number of messages using TM1 in the time period 505 between t1 and t2 in the depicted embodiment.

In some cases, depending on the kind(s) of triggering condition(s) agreed to, one or both of the communicating entities may check the condition at various times after the SPS negotiation is completed at t1. In other cases, the triggering condition may not have to be actively checked by the communicating entities; instead, one or both of the communicating entities may automatically be notified or made aware if the triggering condition happens to be satisfied (e.g., in a scenario in which TM1 comprises a TCP connection, if that connection appears to hang or have been ended abruptly without going through a normal TCP close).

At time t2 along timeline 501, as indicated by label 510, at least one of the communicating entities detects that criteria for switching to TM2 are satisfied. The two entities start using TM2 for subsequent messages of the SPS in the depicted embodiment, without re-negotiating the parameters or state information of the SPS. During time period 515 between t2 and t3, one or more SPS messages, still prepared and analyzed using the same SPS state information which was used prior to t2, are transferred using TM2 in either direction.

At time t3 along timeline 501, as indicated by label 520, at least one of the communicating entities detects that criteria for switching back to TM1 are satisfied. The two entities then start using TM1 for subsequent messages of the SPS in the depicted embodiment, again without re-negotiating the parameters or state information of the SPS. During time period 525 between t3 and t4, one or more SPS messages are transferred using TM1 in either direction, with the communicating entities continuing to use the same SPS state information which was used prior to t3.

At time t4 in the depicted scenario, the SPS may be terminated as indicated by label 530, e.g., after an expiration time interval agreed upon by the communicating entities, or if at least one of the communicating entities determines that no additional messages have to be transferred to the other. The session expiration time may have been agreed upon by the communicating entities in the negotiation phase 502 in the depicted embodiment. Note that depending on the specific transport mechanisms used, TM1 and/or TM2 may have their own idle timeout parameters, which are independent of and decoupled from the session expiration time interval. The SPS state information may be discarded by one or both communicating entities after the SPS session expires in the depicted embodiment.

The approach illustrated in FIG. 5 may be used, for example, in scenarios in which TM1 is a preferred or primary transport mechanism, with (for example) better overall performance and reliability characteristics than TM2. In such scenarios, TM2 may be used as a kind of backup mechanism, used in exceptional circumstances which preclude the continued use of TM1, with the expectation that the preferred mechanism TM1 will be used again as soon as it becomes possible to do so. Over the lifetime of a long-lived SPS, multiple transitions of the kind shown in FIG. 5 may be implemented in various embodiments as needed based on the triggering conditions agreed to, e.g., with the communicating entities switching from TM1 to TM2, then back to TM1, then back to TM2, then back to TM1, and so on.

Example Transport Mechanisms

Figure 6:
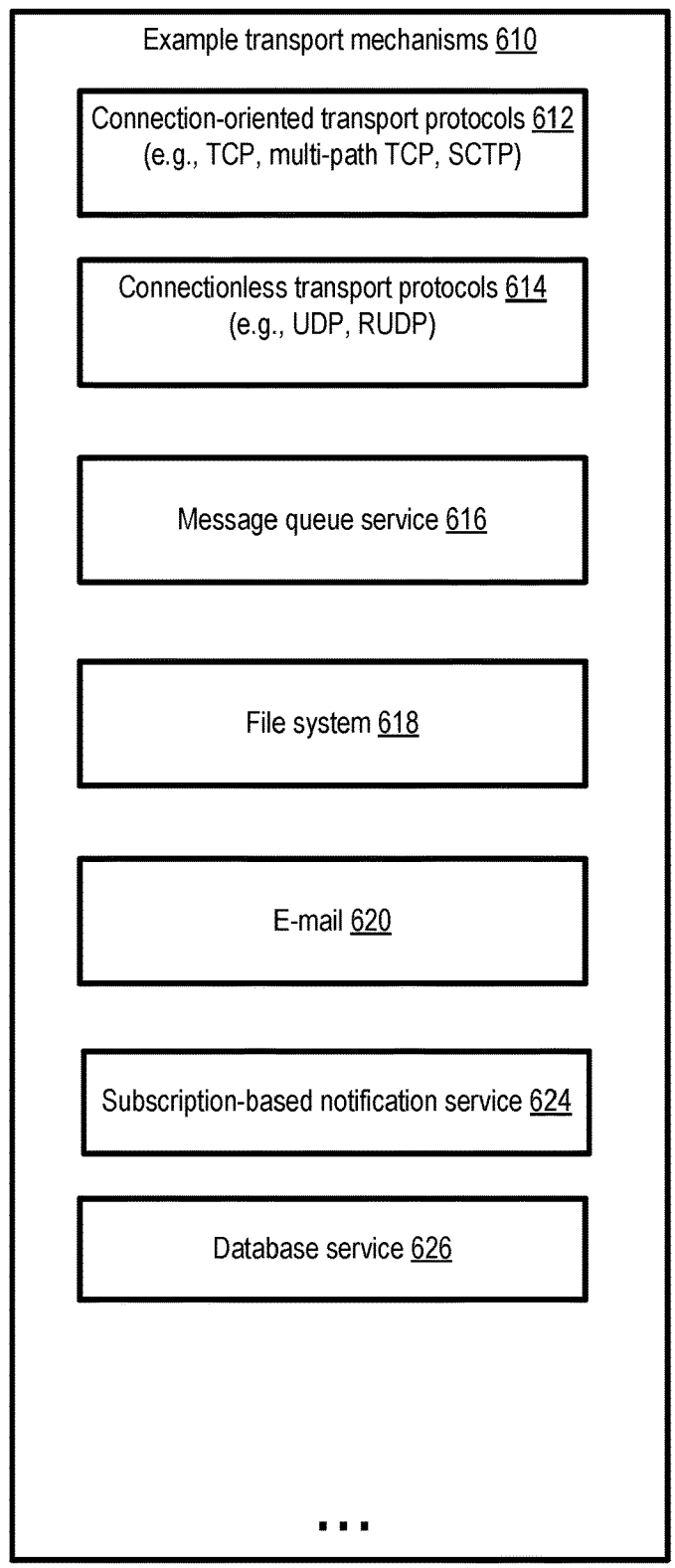
FIG. 6 illustrates example transport mechanisms which may be employed for decoupled security protocol sessions, according to at least some embodiments.

FIG. 6 illustrates example transport mechanisms which may be employed for decoupled security protocol sessions, according to at least some embodiments. Any of the supported transport mechanisms 610 shown in FIG. 6 may be used as a primary or a non-primary mechanism for a given security protocol session in various embodiments. The transport mechanisms 610 may implement connection-oriented transport protocols 612 (e.g., TCP, multi-path TCP, Stream Control Transmission Protocol (SCTP)) in some embodiments as well as connectionless transport protocols 614 such as UDP, Reliable UDP (RUDP) and the like.

In some embodiments, network-accessible services such a message queue service 616, a subscription-based notification service 624, or a database service 626 may be used as transport mechanisms by some communicating entities. To use a message queue service 616, a message source application may submit a message (e.g., encrypted using the SPS state information) and an indication of the targeted recipient application. The message contents may be stored using resources of the message queue service until the targeted recipient application retrieves it. Message queues may thus represent one example of an asynchronous transfer technique, in which messages may be securely stored until the recipient is in a position to receive them.

In one embodiment in which a subscription-based notification service 624 is used for an SPS, both communicating entities of the SPS may subscribe to a notification topic (or a pair of such topics). To send a message to the other entity, the contents of the message may be prepared with the help of the SPS state information, and published to a topic; the notification service may then send an indication of the message to the destination entity.

To use a database service 626 as a transfer mechanism, in some embodiments the communicating entities may choose a particular database table or tables (e.g., during the negotiation phase of the SPS setup) into which the communicating entities of the SPS are permitted to add rows (and read rows) representing respective messages. In at least one embodiment, a file system 618 may be employed as a transport mechanism. For example, the sender of a message may write the message to a file accessible by the receiver, and the receiver may check the file system to detect when new messages have been stored, and read the contents of one or more files of the file system to obtain the new messages. In some embodiments, e-mail 620 (or even text messages) may be used as a transport mechanism.

Example Message Multiplexing

Figure 7:
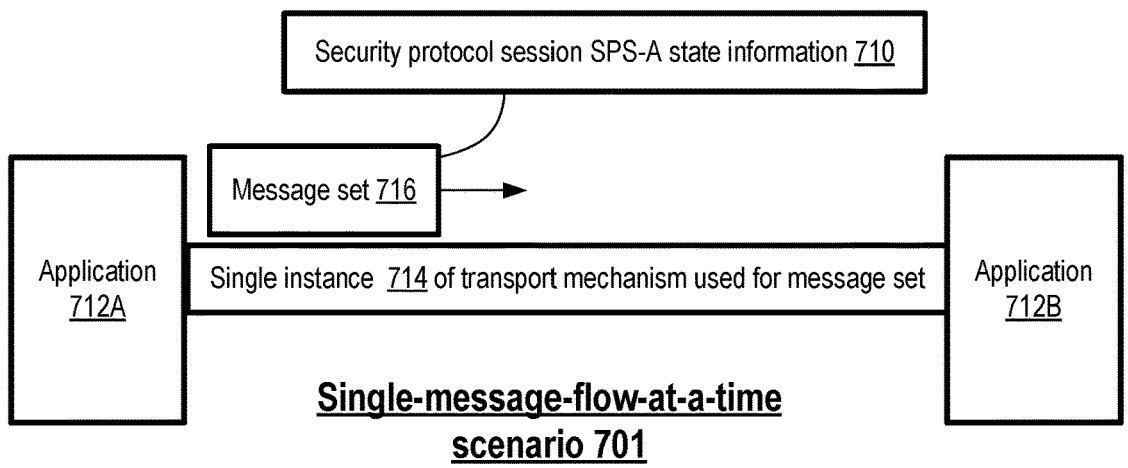
FIG. 7 illustrates an example scenario in which messages of a single security protocol session may be distributed concurrently among several transport mechanism instances, according to at least some embodiments.
Figure 7:
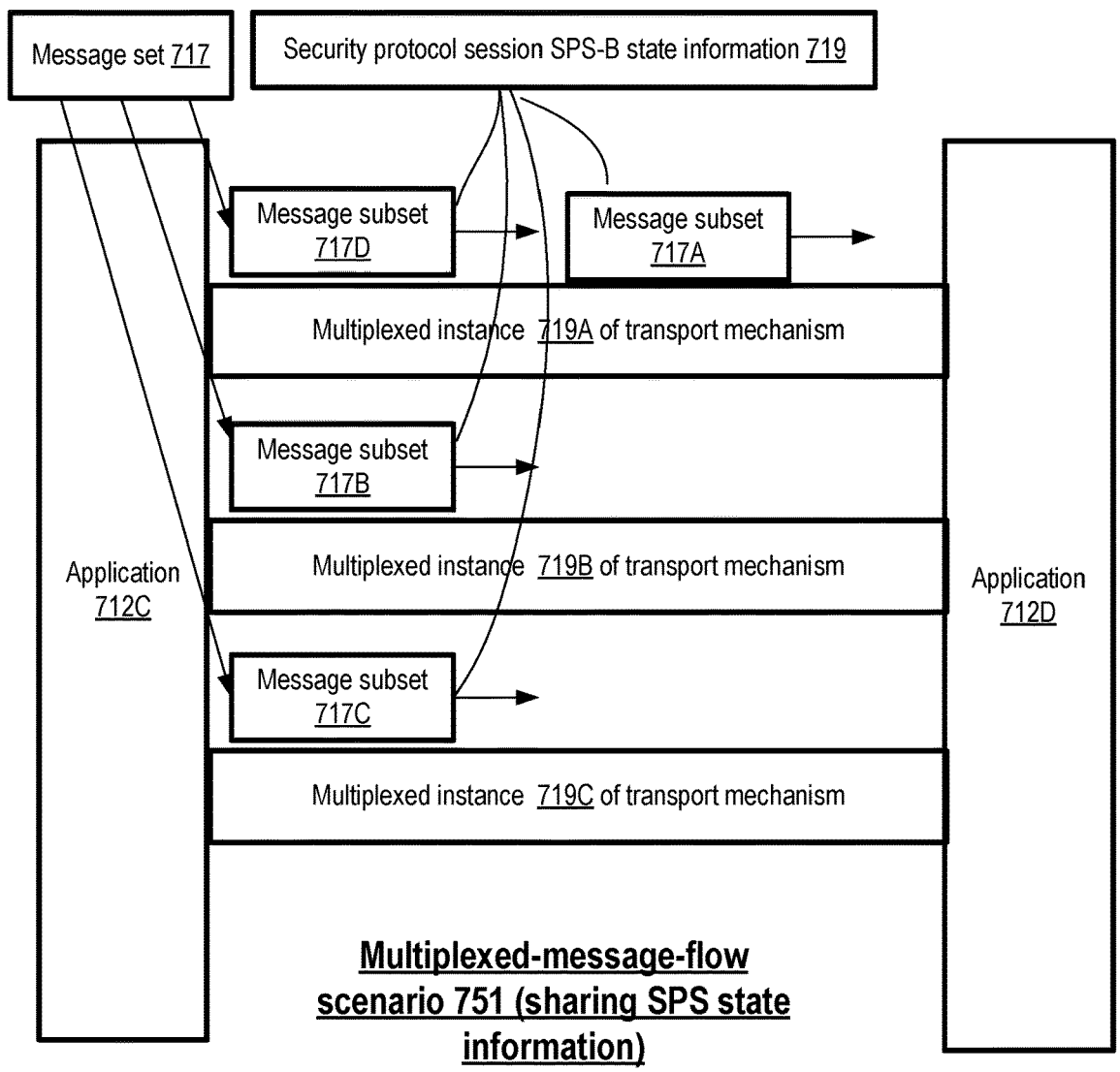

By decoupling secure protocol sessions from underlying transport mechanisms, a number of novel approaches for securing communications may become possible. For example, in traditional systems in which the security protocol session is tightly coupled to a transport mechanism (such as a TCP connection), a single instance of the transport mechanism is used for the transfer the messages of a given session. Such constraints on the number of transport mechanism instances used concurrently for a given SPS may no longer apply when the SPSs are decoupled from the transport mechanisms. FIG. 7 illustrates an example scenario in which messages of a single security protocol session may be distributed concurrently among several transport mechanism instances, according to at least some embodiments.

In the single-message-flow-at-a-time scenario 701, which may represent a baseline or default implementation in some embodiments, a single instance 714 of a transport mechanism may be used for a message set 716 of an SPS (SPS-A) between applications 712A and 712B. Based on the detection of a triggering condition as discussed above, the applications or communicating entities 712A and 712B may start using a different transport mechanism, continuing to use the SPS-A state information 710 without having to re-negotiate the SPS-A parameters and artifacts. However, even after such a transition, only a single instance of the transport mechanism may be used in scenario 701 in the embodiment shown in FIG. 7.

In contrast, in some embodiments, message flows of a single SPS may be distributed concurrently (or near concurrently) across multiple instances of transport mechanisms. In such embodiments, as shown in multiplexed-message-flow scenario 751, multiple instances such as 719A, 719B and 719C of the same transport mechanism (e.g., multiple TCP connections, multiple message queues, etc.) may each be used to submit some messages of the SPS, while all the messages transfers use the same shared SPS-B state information 719. Thus, subset 717A comprising one or more messages of message set 717 may be sent from application 712C to application 712D via multiplexed instance 719A, subset 717B may be sent via multiplexed instance 719B, subset 717C may be sent via multiplexed instance 719C, subset 717D may be sent via multiplexed instance 719A, and so on. The multiplexed message flow scenario 751 may enhance the security of the communications relative to the single-message-flow-at-a-time scenario 701: in order to access the contents of the entire message set 717 in scenario 751, a man-in-the-middle attacker has to successfully breach multiple transport mechanism instances 719A-719C, while in order to access the contents of the entire message set 716, the attacker only has to successfully breach a single transport mechanism instance 714.

In some embodiments, a variant of the technique shown in scenario 751 may be employed. Instead of using multiple instances 719 of the same transport mechanism, one or more instances of different transport mechanisms, all sharing the same SPS state information, may be used. For example, a TCP connection may be used to send some messages of the SPS, while a set of UDP datagrams may be used to send other messages of the SPS.

In some embodiments, some number of messages of an SPS may be distributed first across some number of instances of a first transport mechanism. Then, in response to a detected condition, additional messages may be distributed across some number of instances of a second transport mechanism selected by the communicating entities. If other conditions are satisfied later, the entities may switch back to using several multiplexed instances of the first transport mechanisms, and so on.

In some embodiments, the communicating entities may switch from a single-message-flow-at-a-time approach to a multiplexed-message-flow approach temporarily, for transferring specific subsets of data for which an even higher level of security is desired than is desired for the remainder of the data being transferred. After the specific subsets have been transferred, the single-message-flow-at-a-time approach may be resumed in such embodiments.

Other variants of the multiplexing technique shown in scenario 751 of FIG. 7 may be used in some embodiments. In one approach, multiple transport mechanism instances which share the same SPS state information may also be set up in advance, but only one of the instances may be used at a time. If a criterion for switching transport mechanisms is satisfied, a different transport mechanism may be used for subsequent messages. For example, transport mechanism instances TMI-1, TMI-2, and TMI-3 may be established between two communicating entities App1 and App2, with an agreement that TMI-1 is preferred to TMI-2, and TMI-2 is preferred to TMI-3. App2 may in effect "listen" for messages which may be delivered via any of the three transport mechanism instances. Initially, TMI-1 may be used for some number of messages of an SPS, while TMI-2 and TMI-3 are not used. Then, App1 may determine that a switch to another transport mechanism is needed, e.g., to maintain a desired quality of service for the communications between App1 and App2, and start sending messages via TMI-2. Any of a variety of quality of service objectives may be taken into account to determine whether and when to switch between the transport mechanism instances in different embodiments—e.g., latency requirements, throughput requirements, message loss requirements, out-of-order message ratios, and the like may contribute to the quality of service objectives. If one or more metrics indicate that the currently-in-use transport mechanism instance is unlikely to satisfy the quality of service requirements, an alternative transport mechanism may be used for at least some subsequent messages in such embodiments. Note that similar quality of service considerations may also be used to switch between transport mechanisms in non-multiplexing scenarios in some embodiments, e.g., in scenarios in which multiple instances of transport mechanisms have not been set up in advance.

In the above example, as and when conditions change after the switch to TMI-2, TMI-3 may be used, or TMI-1 may be re-used. Both communicating entities may agree in at least some embodiments that the sender of a particular message does not have to pre-notify the receiver that a different transport mechanism is going to be used for the particular message (and in some cases subsequent messages) than was used for earlier messages. Mid-session coordination/synchronization between the pair of communicating entities may not be required for transitions between transport mechanisms or instances in at least some embodiments, regardless of whether multiplexing is being used or not. In one embodiment, a plurality of alternative transport mechanism instances may be set up and used for a given SPS without any indication or agreement regarding the preference ranking among the instances.

Example Parameters for Controlling Transport Mechanism Transitions

Figure 8:
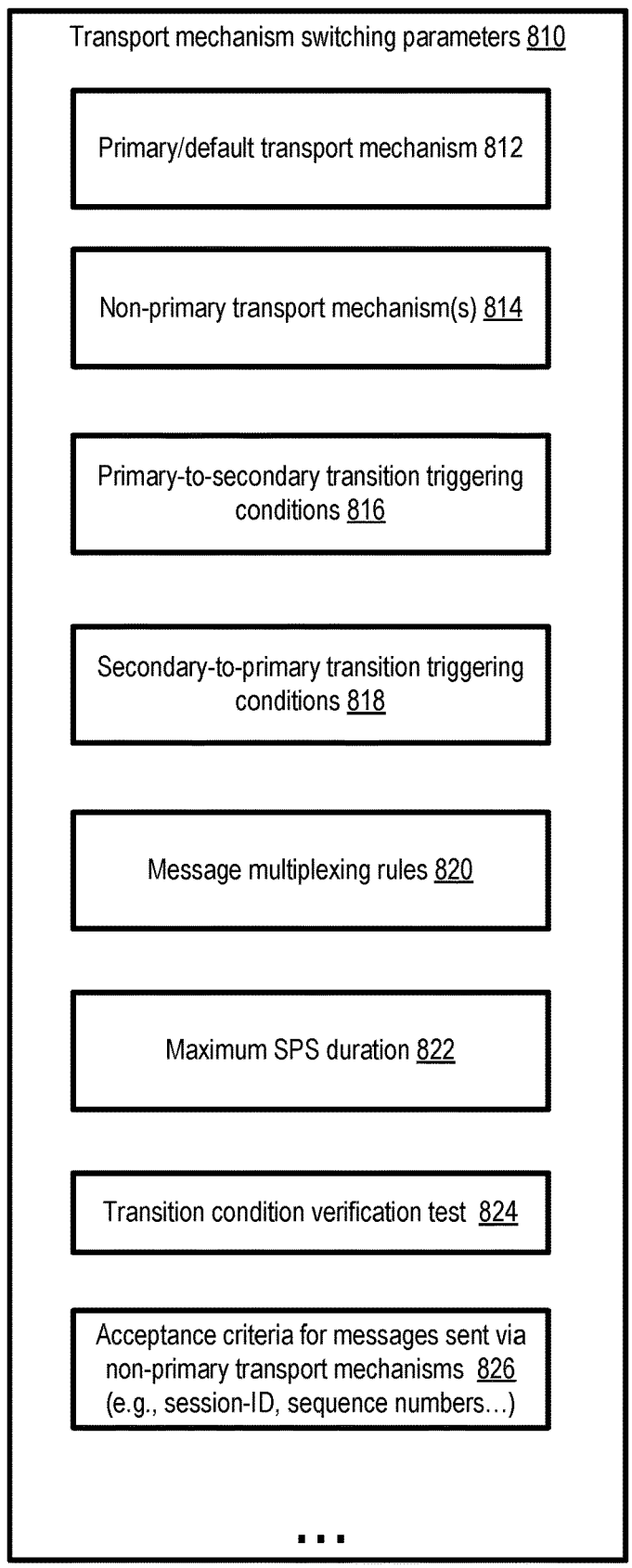
FIG. 8 illustrates example parameters used to manage transport mechanism switching, according to at least some embodiments.

FIG. 8 illustrates example parameters used to manage transport mechanism switching, according to at least some embodiments. One or more of a set of transport mechanism switching parameters 810 may be set, for example, by administrators of the applications whose communications are to be secured using security protocols. In some embodiments the communicating applications may be run at resources (such as compute instances) of a provider network, and a provider network client on whose behalf the applications are run may submit programmatic requests to set the values of some or all of the parameters 810. Such requests may be received via one or more programmatic interfaces of the provider network, such as web-based consoles, application programming interfaces (APIs), command-line tools, graphical user interfaces, and the like. In some embodiments, a given set of parameters 810 may be specified for all the communications between a first set of entities (such as the workflow orchestrators 232 of FIG. 2) and a second set of entities (e.g., nodes of storage services 220, database service 240, etc.). In other embodiments, respective parameters 810 may be specified for individual pairs of applications or processes; for example, different parameters 810 may be specified for communications between a given workflow orchestrator 232 and a given back-end service node such 221A that are specified for communications between that workflow orchestrator 232 and a different back-end service node such 241A.

Parameters 810 may include a primary or default transport mechanism 812, as well as one or more non-primary transport mechanisms 814 in the depicted embodiment. Triggering conditions 816 for transitions from the primary transport mechanism to a secondary transport mechanism may be specified in various embodiments—e.g., indicating that a switch from mechanism TM1 to mechanism TM2 should be initiated in the event of a network partitioning or failure event, in the event of a planned outage of some portions of the network being used for TM1, or in the event of a maintenance event such as an update of some portions of the network.

Triggering conditions 818 for switching back from a secondary mechanism to the primary mechanism may be indicated in parameters 810 in some embodiments. In some cases, such conditions may comprise negations of the conditions 816—e.g., if a detection of an abnormal or unusual condition C1 leads to the transition from primary transport mechanism TM1 to a non-primary transport mechanism TM2, the detection that the abnormal or unusual condition is no longer detected may lead to the switch back to TM1. In other cases, the conditions which lead to resumption of the use of the primary transport mechanism may not necessarily be the converse or opposite of the conditions which led to the transition to the non-primary transport mechanism. In some embodiments in which multiple non-primary transport mechanisms are specified for a primary transport mechanism, respective triggering conditions may be specified for switching between any given pair of transport mechanisms.

Message multiplexing rules 820 may optionally be specified in some embodiments to indicate the conditions (if any) under which the messages of a given SPS are to be distributed among multiple transport mechanism instances in the manner discussed in the context of FIG. 7. A maximum session duration parameter 822 may indicate the amount of time (e.g., from the start of the establishment of the SPS, when the negotiation procedure of the SPS began) after which the SPS is to be ended or closed in various embodiments. This SPS-specific parameter may be independent of the timeout parameters of the underlying transport mechanisms (if any such parameters are used for the transport mechanisms) in various embodiments.

In some embodiments, parameters 810 may include an indication of a verification test 824 to be conducted by a communicating entity before receiving a message sent via a non-primary transport mechanism. For example, consider a scenario in which the triggering condition for switching from TM1 to TM2 is a detection of an impending software/firmware update. Parameter 824 may indicate that even if one of the communicating entities determines that such an upgrade is about to begin and starts to use an alternate transport mechanism, the other communicating entity of the SPS should run the specified test (e.g., by sending a query to an update management system) before accepting any messages from the other entity.

Acceptance criteria 826 for messages sent via non-primary transport mechanisms may be included in parameters 810 in some embodiments. Such criteria may be used to logically link the messages sent via one transport mechanism of an SPS, with the messages sent via another transport mechanism used for the same SPS in the depicted embodiment. For example, each message of the SPS may be required to include a session identifier of the SPS, a sequence number with respect to the SPS, and so on.

In various embodiments, the values of some or all of the parameters 810 to be used for a particular SPS may be shared by one of the communicating entities to the other, e.g., as part of a negotiation procedure similar to the negotiation procedure used for determining cryptographic artifacts and the like. In effect, both communicating entities (applications, processes etc.) of the SPS may have to agree on the parameters 810 in a preliminary step of the SPS in such embodiments.

Illustrative Computer System

Figure 9:
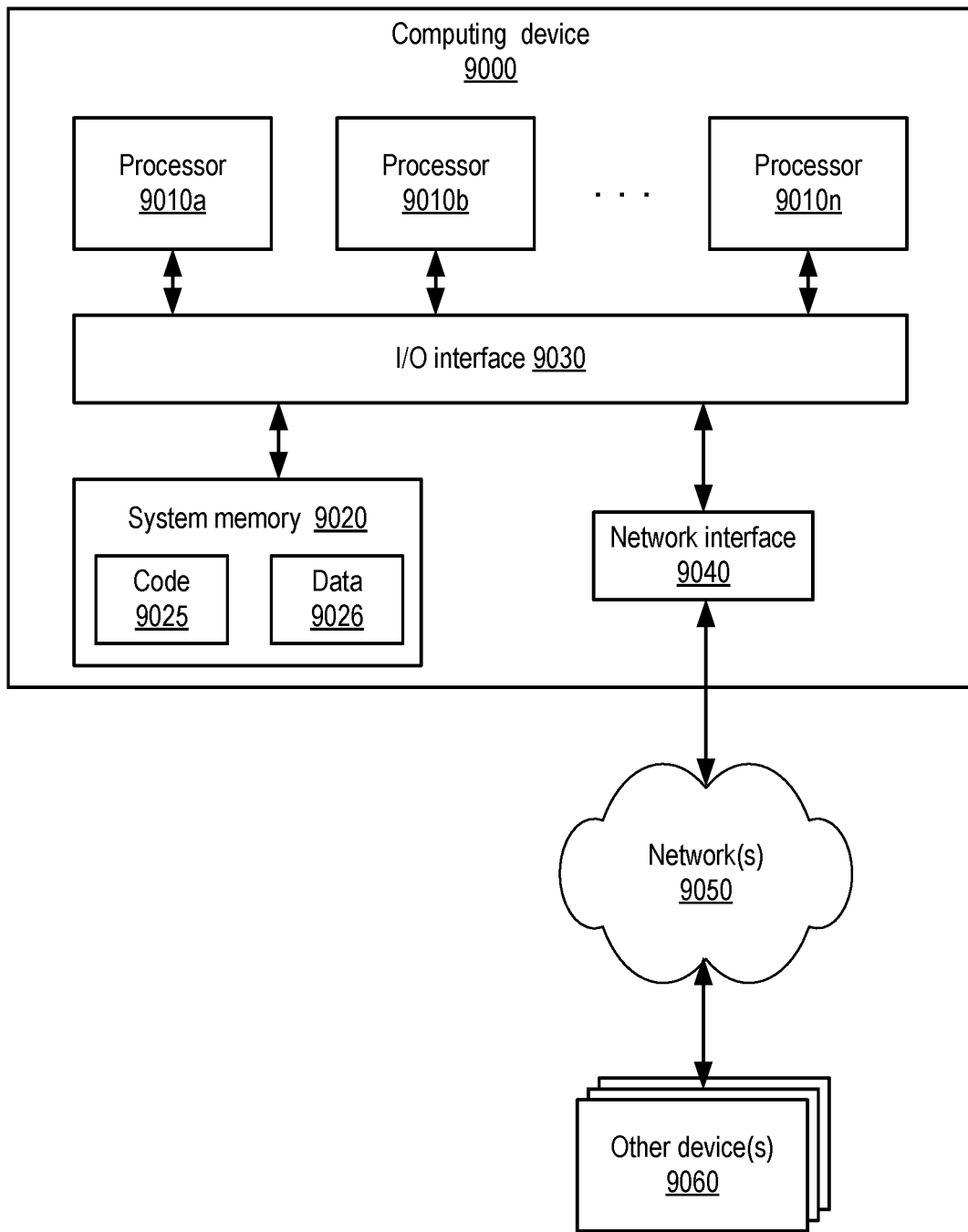
FIG. 9 is a block diagram illustrating an example computing device that may be used in at least some embodiments.

In at least some embodiments, a server that implements the types of techniques described herein (e.g., the establishment of security protocol sessions, storing of security protocol session metadata separately from the metadata associated with the transport mechanisms used for the sessions, storing of transport mechanism switching parameters, exchange of messages via different transport mechanisms and the like), may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
 a first computing device which includes instructions that upon execution on the first computing device cause the first computing device to implement at least a portion of a first application; and a second computing device which includes instructions that upon execution on the second computing device cause the second computing device to implement at least a portion of a second application;

wherein the first application is configured to:
  initiate, using a first transport mechanism, establishment of a Transport Layer Security (TLS) session with the second application, wherein the establishment comprises a multi-message negotiation in which asymmetric cryptography computations are performed, and wherein
    (a) one or more elements of state information of the TLS session are stored in a first data structure at the first computing device, including one or more cryptographic artifacts to be used for encrypting messages transferred during the TLS session, and
    (b) one or more elements of state information of the first transport mechanism are stored in a second data structure at the first computing device, including one or more port numbers used for transferring the messages;
  provide, to the second application, an indication of an alternative transport mechanism which differs from the first transport mechanism, wherein the alternative transport mechanism is to be used for sending one or more messages to the second application subsequent to a detection that a triggering condition has been met;
  transmit one or more messages to the second application using (a) the first transport mechanism and (b) the one or more cryptographic artifacts;
  in response to detecting that the triggering condition has been met, transfer at least a particular message to the second application using (a) the alternative transport mechanism and (b) the one or more cryptographic artifacts, wherein the particular message is transferred without re-implementation of the multi-message negotiation; and
wherein the second application is configured to:
  utilize the one or more cryptographic artifacts to decrypt the one or more messages sent by the first application using the first transport mechanism;
  obtain the particular message via the alternative transport mechanism; and
  utilize the one or more cryptographic artifacts to decrypt the particular message.

2. The system as recited in claim 1, wherein the first transport mechanism implements the Transmission Control Protocol (TCP), and wherein the second transport mechanism implements the User Datagram Protocol (UDP).

3. The system as recited in claim 1, wherein said detecting that the triggering condition has been met comprises one or more of: (a) detecting one or more network errors, (b) obtaining an indication of an impending update, or (c) detecting network performance degradation.

4. The system as recited in claim 1, wherein the first application is further configured to:
  in response to a detection that a second triggering condition has been met after the particular message has been transferred, transfer at least one additional message to the second application using the first transport mechanism.

5. The system as recited in claim 1, wherein the first application is implemented at least in part at a provide network, and wherein the first application is further configured to:
  obtain an indication that a request to use a plurality of transport mechanisms has been submitted via a programmatic interface of the provider network, wherein use of the alternative transport mechanism is responsive to the request.

6. A computer-implemented method, comprising:
  initiating, by a first application using a first transport mechanism, establishment of a security protocol session with a second application, wherein the establishment comprises a multi-message negotiation, wherein one or more cryptographic artifacts used for transforming messages during the security protocol session are determined during the multi-message negotiation;
  transmitting, by the first application, one or more messages to the second application using the first transport mechanism, wherein the one or more messages are prepared using at least some cryptographic artifacts of the one or more cryptographic artifacts; and
  in response to a detection that a first triggering condition has been met, transferring, by the first application without re-implementing the multi-message negotiation, at least a particular message to the second application using a second transport mechanism which differs from the first transport mechanism, wherein the particular message is prepared using at least some cryptographic artifacts of the one or more cryptographic artifacts.

7. The computer-implemented method as recited in claim 6, wherein the first transport mechanism implements the Transmission Control Protocol (TCP), and wherein the second transport mechanism implements the User Datagram Protocol (UDP).

8. The computer-implemented method as recited in claim 6, wherein the security protocol session is a Transport Layer Security (TLS) session.

9. The computer-implemented method as recited in claim 6, further comprising:
  the first application providing an indication of the second transport mechanism to the second application prior to transferring the particular message via the alternate transport mechanism.

10. The computer-implemented method as recited in claim 6, wherein the first transport mechanism implements a transport layer networking protocol of the Open Systems Interconnect model, and wherein transferring the particular message via the second transport mechanism comprises transmitting the particular message to a queue at a network-accessible queueing service of a provider network, the computer-implemented method further comprising:
  determining, by the second application, that a message directed to the second application has been placed in the queue; and
  obtaining the particular message by the second application from the queue in response to said determining.

11. The computer-implemented method as recited in claim 6, wherein the first transport mechanism implements a transport layer networking protocol of the Open Systems Interconnect model, and wherein transferring the particular message via the second transport mechanism comprises storing the particular message at a file system accessible from the second application, the computer-implemented method further comprising:
  reading the particular message by the second application from the file system.

12. The computer-implemented method as recited in claim 6, further comprising:

in response to a detection that a second triggering condition has been met, transferring, by the first application without re-implementing the multi-message negotiation, at least one additional message to the second application using the first transport mechanism, wherein the additional message is prepared using at least some cryptographic artifacts of the one or more cryptographic artifacts.

13. The computer-implemented method as recited in claim 6, further comprising:

decrypting the particular message by the second application using a first cryptographic artifact of the one or more cryptographic artifacts;

receiving a first additional message by the second application via the second transport mechanism;

discarding the first additional message by the second application in response to detecting an anomaly associated with the first additional message;

retaining the one or more cryptographic artifacts by the second application after the discarding;

receiving, after said discarding, a second additional message by the second application via the second transport mechanism; and decrypting the particular message by the second application using the first cryptographic artifact.

14. The computer-implemented method as recited in claim 6, further comprising:

storing, by the second application, an expiration criterion of the security protocol session, wherein the expiration criterion differs from a timeout criterion of at least one transport mechanism of the first and second transport mechanisms; and discarding, by the second application, state information of the security protocol session in response to detecting that the expiration criterion has been satisfied.

15. The computer-implemented method as recited in claim 6, further comprising:

obtaining, by the first application from the second application, (a) an indication of a plurality of transport mechanisms usable to communicate with the second application, including the second transport mechanism and a third transport mechanism and (b) an indication of a respective preference ranking of individual transport mechanisms of the plurality of transport mechanisms; and the first application notifying the second application that the second transport mechanism has been selected by the first application as an alternate transport mechanism to the first transport mechanism.

16. One or more non-transitory computer-accessible storage media storing program instructions that when executed on or across one or more processors cause the one or more processors to implement a first application configured to:

initiate, by the first application using a first transport mechanism, establishment of a security protocol session with a second communicating entity application, wherein the establishment comprises a multi-message negotiation, wherein one or more cryptographic artifacts used for transforming messages during the security protocol session are determined during the multi-message negotiation;

transmit, by the first application, one or more messages to the second application using the first transport mechanism, wherein the one or more messages are prepared using at least some cryptographic artifacts of the one or more cryptographic artifacts; and in response to a detection that a first triggering condition has been met, transfer, by the first application without re-implementing the multi-message negotiation, at least a particular message to the second application using a second transport mechanism which differs from the first transport mechanism, wherein the particular message is prepared using at least some cryptographic artifacts of the one or more cryptographic artifacts.

17. The one or more non-transitory computer-accessible storage media as recited in claim 16, storing further program instructions that when executed on or across the one or more processors cause the first application to:

establish the second transport mechanism prior to detecting a triggering condition for a transition from the first transport mechanism to the second transport mechanism.

18. The one or more non-transitory computer-accessible storage media as recited in claim 16, storing further program instructions that when executed on or across the one or more processors cause the first application to:

determine, based at least in part on a quality of service objective, that the particular message is to be transferred via the second transport mechanism instead of the first transport mechanism.

19. The one or more non-transitory computer-accessible storage media as recited in claim 16, wherein the first transport mechanism uses a connection-oriented protocol, and wherein the second transport mechanism does not use the connection-oriented protocol.

20. The one or more non-transitory computer-accessible storage media as recited in claim 16, wherein the one or more cryptographic artifacts include a first cryptographic parameter and a second cryptographic parameter, the one or more non-transitory computer-accessible storage media storing further program instructions that when executed on or across the one or more processors cause the first application to:

encrypt individual ones of the one or more messages using the first cryptographic parameter; and encrypt the particular message using the second cryptographic parameter.

\* \* \* \* \*